United States Patent [19]
Tofield et al.

[11] 3,949,319
[45] Apr. 6, 1976

[54] HIGH ENERGY STORAGE LASERS EMPLOYING PEROVSKITES CONTAINING RARE EARTHS

[75] Inventors: Bruce Cedric Tofield, Eatontown; Heinz Paul Weber, Middletown, both of N.J.

[73] Assignee: Bell Telephone Laboratories, Incorporated, Murray Hill, N.J.

[22] Filed: Sept. 12, 1974

[21] Appl. No.: 505,206

[52] U.S. Cl. .............................. 331/94.5 F; 330/4.3
[51] Int. Cl.² .......................................... H01S 3/16
[58] Field of Search .................. 331/94.5; 330/4.3; 252/301.2 R, 301.4 R; 250/458, 493

[56] References Cited
OTHER PUBLICATIONS
Dieke, Spectra and Energy Levels of Rare Earth Ions in Crystals, Wiley and Sons, N.Y. (1968), pp. 125–127.
Galasso et al., $Ba(B_{0.5}Ta_{0.5})O_3$ Ordered Perovskite–Type Compounds, Possible New Laser Host Materials, J. Chem. Phys., Vol. 44, No. 7, (Apr. 1, 1966), pp. 2703–2707.
Hoehn et al., Magnetic Susceptibilities of Trivalent Ionthamide Ions in an octahedral Environment, J. Chem. Phys., Vol. 60, No. 2, (Jan. 15, 1974), pp. 393–397. (Apr. 1,

*Primary Examiner*—William L. Sikes
*Attorney, Agent, or Firm*—Wilford L. Wisner

[57] ABSTRACT
New lasers employ a halide crystal including alkali metals and rare earths with a very high concentration of the active ions that are arranged to have largest possible separation between themselves. Such laser crystals provide very high energy storage that is finally released in the form of optical radiation. The high energy storage is attributable to a relatively low gain per unit length. The halide crystal is of the perovskite type and typically includes two alkali metals, one of which, for example, sodium, has a much smaller ionic charge than the rare earths and, therefore, will be ordered on the octahedral sites of the perovskite crystal with respect to the rare earth atoms. The stoichiometry of the materials facilitates the high concentration of the rare earth active ions; and the ordering or strict sequencing of alkali and rare earth ions facilitates the large separation of the rare earth active ions which is necessary to minimize non-radiative decay via rare earth pair interaction. If other rare earths are employed other than the active ion, they can serve as diluents or energy transferring elements but are typically not ordered with respect to the active ions, even though on the octahedral sites, unless they are sufficiently different in size from the active ion. In addition, transition metal ions such as chromium can be included and will appear on the octahedral sites and serve to transfer energy to the active ion. When erbium (Er), ytterbium (Yb) or thulium (Tm) are included in suitable combinations, energy conversion of the emission from the infrared to the visible can be obtained. A typical crystal is dicesium sodium neodymium hexachloride ($Cs_2NaNdCl_6$), in which $Nd^{3+}$ is the active ion. It is likely that the alkali metals may be replaced by other monovalent ions such as thallium ($Tl^+$), ($Cu^+$), and silver ($Ag^+$).

13 Claims, 13 Drawing Figures

HIGH ENERGY STORAGE LASERS EMPLOYING PEROVSKITES CONTAINING RARE EARTHS

BACKGROUND OF THE INVENTION

This invention relates to lasers employing solid-state crystalline materials in which the active ion is an integral part of the compound of the crystal, not a dopant, and has a concentration more than 20 times higher than in doped glass or conventional, doped crystalline lasers.

It has been recently appreciated that active ion concentration in a solid-state dielectric crystal laser can be substantially increased if the anions sufficiently shield the active ions from each other. An example is that disclosed in U.S. Pat. No. 3,813,613, of H. G. Danielmeyer and one of us, H. P. Weber, issued May 28, 1974, and assigned to the assignee hereof. That success implies that the ordering of the elements within the crystal is sufficiently strict that the active ions, e.g., neodymium, do not come too close to each other. The resulting high concentrations permissible have yielded surprisingly small lasers and are expected to lead to still smaller lasers and, in some applications, to improvements in pumping efficiently and lasing threshold.

As a consequence of the foregoing development, further effort has been directed toward finding other compounds in which the active ion, such as neodymium ($Nd^{3+}$) is an integral part of the compound forming the crystal lattice.

SUMMARY OF THE INVENTION

Our invention is based on our discovery that a suitable kind of ordering of ions in the crystalline lattice occurs in halide crystals of the perovskite type.

The principal feature of our invention based on the foregoing discovery is a high-energy-storage, low-gain rare earth laser apparatus employing such crystals in which the active rare earth ion occupies a portion of the octahedral sites of the perovskite crystalline lattice and is ordered on the octahedral sites with respect to a non-rare earth element of different ionic charge, although a substantial difference in ionic radii of atoms on the octahedral sites may also produce such ordering. An example of such a laser is one employing the perovskite crystal, dicesium sodium neodymium hexachloride ($Cs_2NaNdCl_6$), in which the concentration of $Nd^{3+}$ is about $3.2 \times 10^{21}$ $cm^{-3}$. Another example is $Cs_2NaNd_{(1-x)}Y_xCl_6$, specifically for $x = 0.99$ and $(1-s) = 0.01$. The room temperature fluorescence lifetimes are 1.23 milliseconds for the yttrium-free crystal and 4.1 milliseconds for the yttrium-containing crystal, which are the longest reported so far for $Nd^{3+}$ in any environment.

This compound shows small concentration quenching of fluorescence similar to that observed in the $NdP_5O_{14}$ laser, mentioned above, which had the concentration of neodymium approximately the same, namely, $4 \times 10^{21}$ $cm^{-3}$. In general, it can be said that the concentration quenching of fluorescence is no worse than comparable to that of the pentaphosphate material of like active ion concentration. This property is related to the isolation of the $Nd^{3+}$ ions, which are located in discrete $NdCl_6^{3-}$ octahedral and have a minimum separation of 0.77 nanometers (1 nanometer = $1 \times 10^{-9}$ meters).

While not wishing to limit our invention by the following explanation, we believe that the long fluorescence lifetime of our new lasers results from the strict octahedral coordination of the neodymium ions, and that this coordination strictly forbids direct electric-dipole electronic transitions. Both absorption and emission are believed to be dominated by phonon-assisted electronic transitions.

Advantageously, the new lasers according to our invention may be particularly useful as laser amplifiers at very high power levels because they have very large energy storage capability, and show little tendency to super-radiance or spurious oscillations in advance of the stimulating radiation that is to be amplified. There is a substantial need for such high power amplifiers in the fields of plasma studies, nuclear fusion research, and studies of materials, e.g., by means of coherent spectrometers. Such high power amplifiers, of course, would be initially triggered by small laser oscillators operating at the frequency desired to be amplified.

Alternatively, such a high power laser amplification system may also be useful in laser machining apparatuses. The spiking interval becomes longer than in prior lasers, which fact is desired for certain machining processes.

BRIEF DESCRIPTION OF THE DRAWING

Further features and advantages of our invention will become more apparent from the following detailed description, taken together with the drawing in which.

DESCRIPTION OF ILLUSTRATIVE EMBODIMENTS

Figure 1:
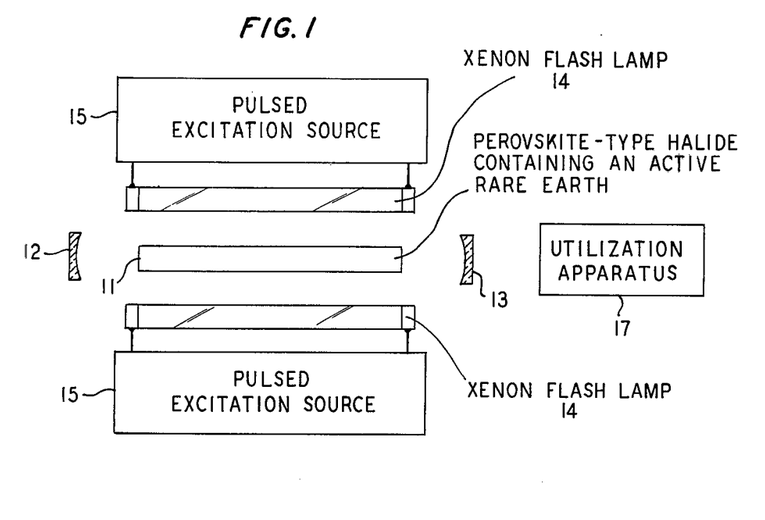
FIG. 1 is a partially schematic and partially block diagrammatic illustration of a preferred embodiment of our invention.

In FIG. 1 there is shown a laser according to the invention of a type that could be useful for laser machining or as one stage of a multiple-stage laser amplifier for nuclear fusion studies. In the latter case, the input signal to be amplified would be admitted through a partially transmissive end reflector 12, although this alternative is not illustrated in detail.

The laser amplifier is based upon the crystal 11 of the perovskite-type hexahalide including a rare earth, for example, dicesium sodium neodymium hexachloride ($Cs_2NaNdCl_6$). The perovskite-type crystal is a particular, well-known type of cubic, isotropic crystal characterized by a particular arrangement of next-nearest neighbors in the crystalline lattice. The finished and suitably mounted crystal 11 is typically cylindrical and measures approximately 2–10 centimeters long times 0.5–1 centimeter in diameter. The reflectors 12 and 13 are typically metal-coated dielectric-base reflectors intended for operation at about 1.06 micrometers, reflector 13 being partially transmissive. Reflectors 12 and 13 could also be reflectors of multiple-layer dielectric coatings approximately ¼ wavelength thick. Additional optional components of the resonator include an etalon for axial mode selection and a prism or grating for frequency-selection. These optional components are not shown and are not appropriate to some applications.

The laser crystal 11 is pumped by the xenon flashlamps 14 which are of well-known type. The flashlamps 14 are driven by pulsed excitation source 15 or sources 15.

In the event that the laser of FIG. 1 is used for laser machining, the utilization apparatus 17 would be the intended workpiece. Otherwise, it could be a sample intended for investigation or a body intended for vaporization to produce the nuclear fusion type of plasma.

The operation of the embodiment of FIG. 1 will be explained starting from theoretical explanations of measurements and parameters of the crystal 11 obtained outside of its optical resonator 12, 13.

Figure 12:
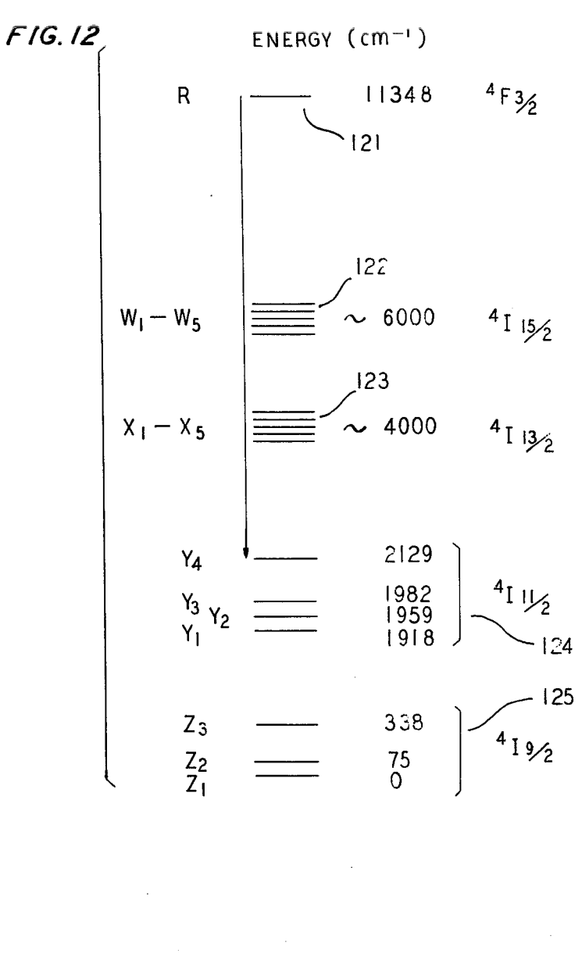

For $Cs_2NaNdCl_6$ ($\rho(Nd) = 3.2 \times 10^{21} cm^{-3}$) and for $Cs_2NaNd_{0.01}Y_{0.99}Cl_6$, the room temperature fluorescence lifetimes are measured to be 1.23 msec and 4.1 msec, respectively, which are the longest reported so far for $Nd^{3+}$ in any environment. This compound shows weak concentration quenching of fluorescence, comparable to that observed in $NdP_5O_{14}$ which has $\rho(Nd) = 4 \times 10^{21} cm^{-3}$. This weak quenching is related to the isolation of the $Nd^{3+}$ ions which are located in discrete $NdCl_6^{3-}$ octahedral and have a minimum separation of 0.77 nm. The long fluoresence lifetime is believed to result from the strict octahedral coordination of $Nd^{3+}$, which strictly forbids direct electric-dipole electronic transitions. Absorption and emission of the $^4F_{3/2}$ - $^4I_{9/2}$ and $^4I_{11/2}$ levels as shown in the energy level diagram of FIG. 12, are found to be dominated by phonon-assisted electronic transistions. The ground state to $^4F_{3/2}$ nophonon line is observed in absorption at 1.8°K, and the phonon-assisted spectra at shorter wavelengths are used to interpret the $^4F_{3/2}$ to $^4I_{9/2}$ emission spectra at 1.8°K. The phonon-assisted spectra associated with the $^4F_{3/2}$ to $^4I_{11/2}$ emission are not the same as observed for the $^4F_{3/2}$ to $^4I_{9/2}$ emission, but a tentative assignment has been made. Due to the reduction of the phonon populations at lower temperatures, the emission cross-sections are reduced and the lifetimes of the concentrated and dilute crystals increase to 5 msec and 11 msec, respectively, at 77°K. A comparison with YAG:Nd and NdP $_5O_{14}$ indicates that ~5% of absorbed photons are emitted into the $^4I_{11/2}$ levels in $Cs_2NaNdCl_6$ at room temperature and an approximate peak emission cross-section of $1.2 \times 10^{-21} cm^2$ is calculated for the $^4F_{3/2}$ to $^4I_{11/2}$ emission. This is ~100 times lower than found for $NdP_5O_{14}$ and indicates a low gain in pulsed laser operation. Because of the far longer lifetime, however, the gain per ion under CW operations is predicted to be ~10 times lower than for $NdP_5O_{14}$, and ~7 times if diluted samples of the two compounds are compared with each other.

Figure 4:
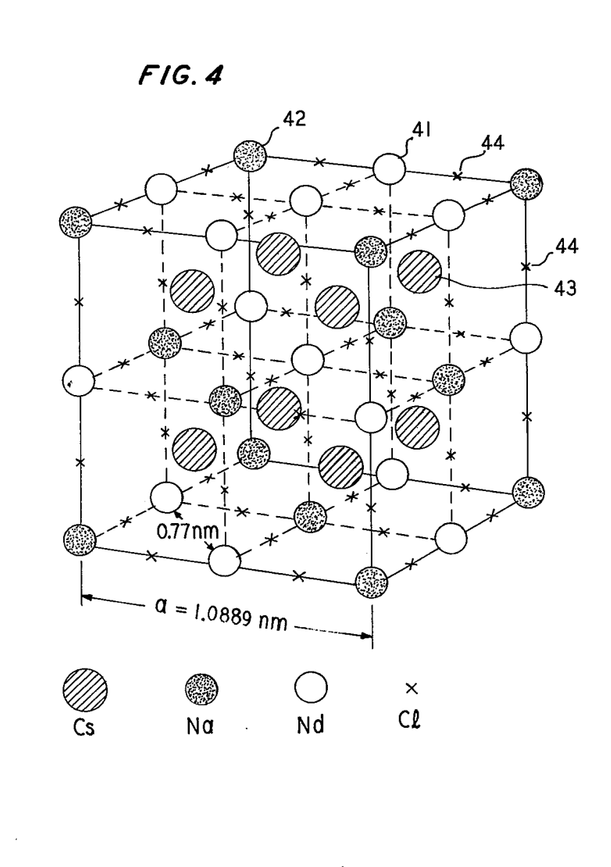
FIG. 4 shows a perspective drawing of a representation of the crystalline lattice of a typical crystal used in our invention.

The $Na^+$ and $Nd^{3+}$ ions are ordered on the octahedral sites so that the lattice parameter (1.0889 nm) is double that of the simple perovskite cell (FIG. 4) and both ions are on sites of point symmetry m3m. As shown in the conceptualized crystal lattice diagram of FIG. 4, the $Nd^{3+}$ ions are arranged on a face-centered cubic sublattice and thus the $Nd^{3+}$ concentration ($3.2 \times 10^{21}$ per cc) is the maximum possible for the given separation.

In spite of the large $Nd^{3+}$-$Nd^{3+}$ separation, the concentration of neodymium ions is over twenty times greater than that which can be used in conventional laser hosts such as Nd:YAG. At higher $Nd^{3+}$ concentrations in YAG, fluorescence quenching of the 1.06$\mu$m $^4F_{3/2}$ $^4I_{11/2}$ emission (see FIG. 12) arising via nonradiative decay from Nd-pair interactions is observed. In YAG, however, the nearest neighbor rare earth-separation may be as low as 0.37 nm, and recent studies on the high $Nd^{3+}$ concentration material, neodymium pentaphosphate ($NdP_5O_{14}$), where the nearest $Nd^{3+}$-$Nd^{3+}$ distance is 0.519 nm, have shown that fluorescence quenching is not severe, despite the high $Nd^{3+}$ concentration (~$4 \times 10^{21}$ per cc). It is thought that this is caused by the large rare earth separation and by the position of the $^4I_{15/2}$ level being unfavorable for inducing non-radiative decay by pair interaction.

In $Cs_2NaNdCl_6$ the $Nd^{3+}$ concentration is only twenty percent less than in $NdP_5O_{14}$, but the minimum separation is 50 percent greater. As well as allowing the study of rare earth absorption and fluorescence spectra and excited state lifetimes in an octahedral crystal field, this host also allows a further investigation of the effect of the $Nd^{3+}$-$Nd^{3+}$ separation on the fluorescence quenching of the $^4F_{3/2}$-$^4I_{11/2}$ transition. If one assumes an electric-dipole interaction for this process, with an $r^{-6}$ dependence on distance, the probably central role of the rare earth separation distance becomes apparent. Nevertheless, we do not wish our invention to be limited by this theory.

We have studied the infrared emission from the $^4F_{3/2}$ to the $^4I_{11/2}$ and $^4I_{9/2}$ levels and absorption from $^4I_{9/2}$ to $^4F_{3/2}$ at 300°K, 77°K and 1.8°K. The crystal field levels of the $^4I_{9/2}$ and $^4I_{11/2}$ manifolds have been tentatively assigned and the $^4F_{3/2}$ lifetime has been measured at 300°K and 77°K in $Cs_2NaNdCl_6$ and $Cs_2NaNd_{0.01}Y_{0.99}Cl_6$. Although we have chosen to study $Nd^{3+}$ because of the associated interest in $Nd^{3+}$-$Nd^{3+}$ interactions, the chloride host will accept all the rare earth ions (and several other trivalent metal ions). The roles of such other ions in similar laser devices will be potentially useful and valuable.

Crystal Growth

Crystals of $Cs_2NaNdCl_6$ and $Cs_2NaNd_{1-x}Y_xCl_6$ (x ~ 0.99) were grown by the Bridgman method in evacuated quartz ampoules at 800°–850°C. Starting materials were anhydrous 99.999 percent $NdCl_3$ and $YCl_3$ (Research Chemicals), 99.99 percent CsCl (Gallard-Schlesinger) and "AnalaR" NaCl (British Drug Houses). The alkali halides were dried under vacuum at 500°–600° before use and the rare earth chlorides purified by vacuum sublimation. All subsequent handling and mixing was performed in a nitrogen-filled dry box.

Debye-Scherrer X-ray photographs of the powdered crystals showed the expected superlattice lines indicating Na-Nd ordering and the high angle lines showed no splittings which would be indicative of distortions from cubic symmetry. No impurity lines were observed and the lattice parameters agreed with those given by Morss et al.

Pure polycrystalline samples were also prepared by evaporation to dryness of solutions of the mixed chlorides in concentrated hydrochloric acid. The fluorescence lifetimes observed for these samples were in agreement with those obtained for the single crystals, indicating freedom from hydrogen containing impurities. Single crystals may also be grown from this polycrystalline material, which should be dried under vacuum at 200°–300°C before sealing in the quartz ampoule.

The perovskite chlorides are considerably more stable to attack by atmospheric moisture than the rare-earth trichlorides, and the measurements reported here could be carried out without special sample-handling procedures. Nevertheless, it would be preferable to protect a laser crystal.

Spectroscopy

Absorption

Figure 5:
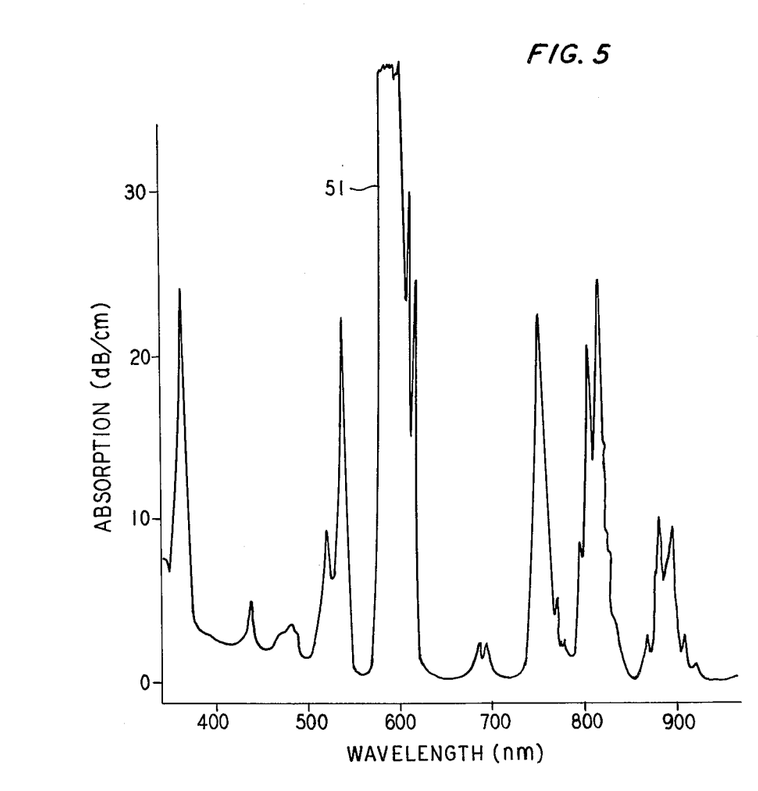
FIGS. 5 through 12 show curves which are useful in explaining the theory and operation of our invention.

The crystal was cut into a platelet of 5 mm thickness and polished on a dry lap with Linde 1 $\mu$m alumina abrasive powder. The absorption spectrum, measured with a model 14R Cary recording spectrometer, in dB per centimeter versus wavelength in nanometers, is shown in curve 51 of FIG. 5. The strengths of the absorption bands at 750 nm and 800 nm are about 30 times weaker than in $NdP_5O_{14}$; while the absorption bands in the visible range are about 10 times weaker. The widths of the lines are comparable to those found in $NdP_5O_{14}$.

Figure 6:
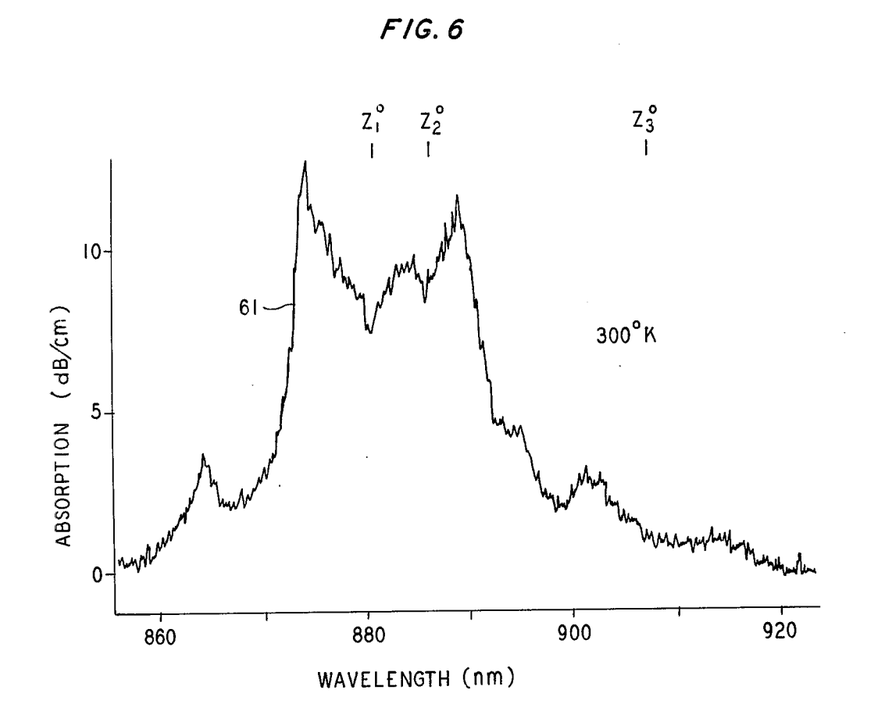

The room temperature (300°K) absorption around 880 nm is shown in more detail in curve 61 of FIG. 6. This is the transition from the ground-state manifold ($^4I_{9/2}$) to the $^4F_{3/2}$ manifold.

The energy level diagram of $Nd^{3+}$ in an octahedral crystal field is simpler than in lower symmetry environments. It is set out in detail in FIG. 12. In particular, the $^4F_{3/2}$ level is unsplit; and the $^4I_{9/2}$ ground state and $^4F_{11/2}$ lower laser state manifolds are split into three and four levels, respectively, as is shown in FIG. 12. The $^4I_{13/2}$ and $^4I_{15/2}$ manifolds both split into five levels. The room temperature absorption spectrum is dominated by phonon-assisted transitions, however, and no estimate of the ground state splittings can be made. The non-phonon lines determined from the liquid helium spectra are indicated (we use the conventional nomenclature to describe the $Nd^{3+}$ infrared lines).

More information can be gained from absorption measurements at 1.8°K. Only the lowest ground state level will be occupied so that a single electronic $^4I_{9/2}$ — $^4F_{3/2}$ transition should be seen. The measured spectrum is shown in curve 71 of FIG. 7. The measurement is expressed in percent transmission versus wavelength. The transmission of light from an incandescent filament was measured with a 1 m grating spectrometer and a cooled photomultiplier with an S 1 cathode. The light was modulated with a chopper and a lock-in amplifier was used. A single sharp line is observed at 881.2 nm. Broad absorption bands of significantly greater intensity are observed at higher energy and extend to ≈860 nm. We interpret the 881.2 nm line as the no-phonon magnetic dipole $^4I_{9/2}$ ground state to $^4F_{3/2}$ transition and this is confirmed by the 1.8°K emission spectrum, discussed hereinafter. The broad lines are interpreted as phonon-assisted electric-dipole transitions. At 1.8°K, the phonon absorption is associated with the emission of a phonon so that these transitions show a blue shift relative to the electronic transition frequency. The phonon-assisted bands extend to ≈280 cm$^{-1}$ from the no-phonon line. This offset agrees with the energies of the vibronic side bands observed for $Ce^{3+}$ in $Cs_2NaYCl_6$(11) and is consistent with an expected phonon cut-off frequency of ≈300 cm$^{-1}$ for this structure.

As developed elsewhere, the intensity distribution $I(\omega)$ of the phonon side-bands at zero temperature is simply related to the phonon density of states $\rho(\omega)$ $$\rho(\omega) \propto I(\omega).\omega \qquad (1)$$

Figure 7:
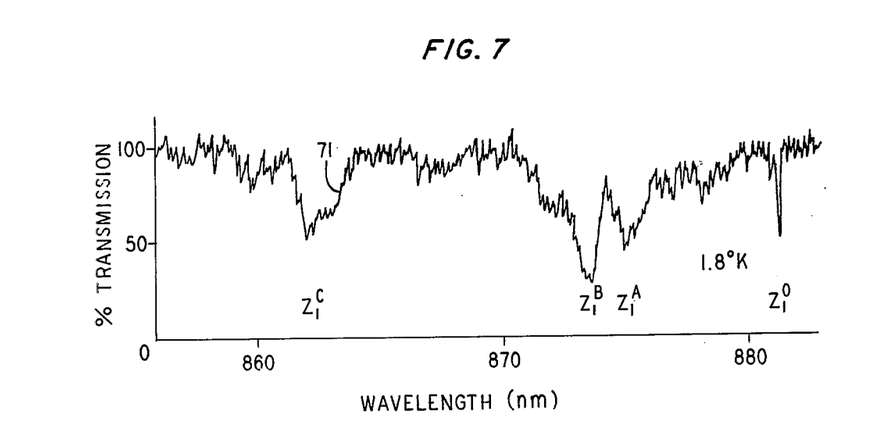

However, the relative intensities of the vibronic transitions do not necessarily indicate the actual relative strength of the peaks of $\rho(\omega)$ as the coupling coefficients between the electronic excitation and the infrared phonons need not be constant and, therefore, we have not converted the intensities of FIG. 7 according to Equation 1.

The intensity distribution of the vibronic transitions is relatively simple, although the phonon spectrum should have 120 branches, and we have labeled the dominant features of curve 71 $Z_1^A$, $Z_1^B$ and $Z_1^C$. (The no-phonon line is labeled $Z_1^0$.) It is likely that these features reflect a high density of infrared phonon states at these energies (~80 cm$^{-1}$, ~100 cm$^{-1}$ and 240–250 cm$^{-1}$, respectively). If, as found elsewhere for $Pr^{3+}$ and $Nd^{3+}$ in $NdCl_3$, these vibronic lines are due to flat portions of high symmetry in the Brillouin zone; it should be possible to relate them to $k = 0$ modes in the infrared spectrum.

Because of the high $Nd^{3+}$ site symmetry which forbids no-phonon electric dipole transitions, the phonon-assisted transitions observed in this work are unique insofar as their strengths are far greater than those of the no-phonon lines.

Emission

The fluorescence at 1.8°K from the same sample crystal was measured in transmission with excitation by the 514.5 nm line of an Ar ion laser. The pump beam passed first through a Schott BG 18 infrared absorption filter, was modulated with a chopper wheel, and focused onto the sample. The fluorescence was collected with a lens and focused onto the slit of a 1 m grating spectrometer, and a lock-in amplifier was again used.

Figure 8:
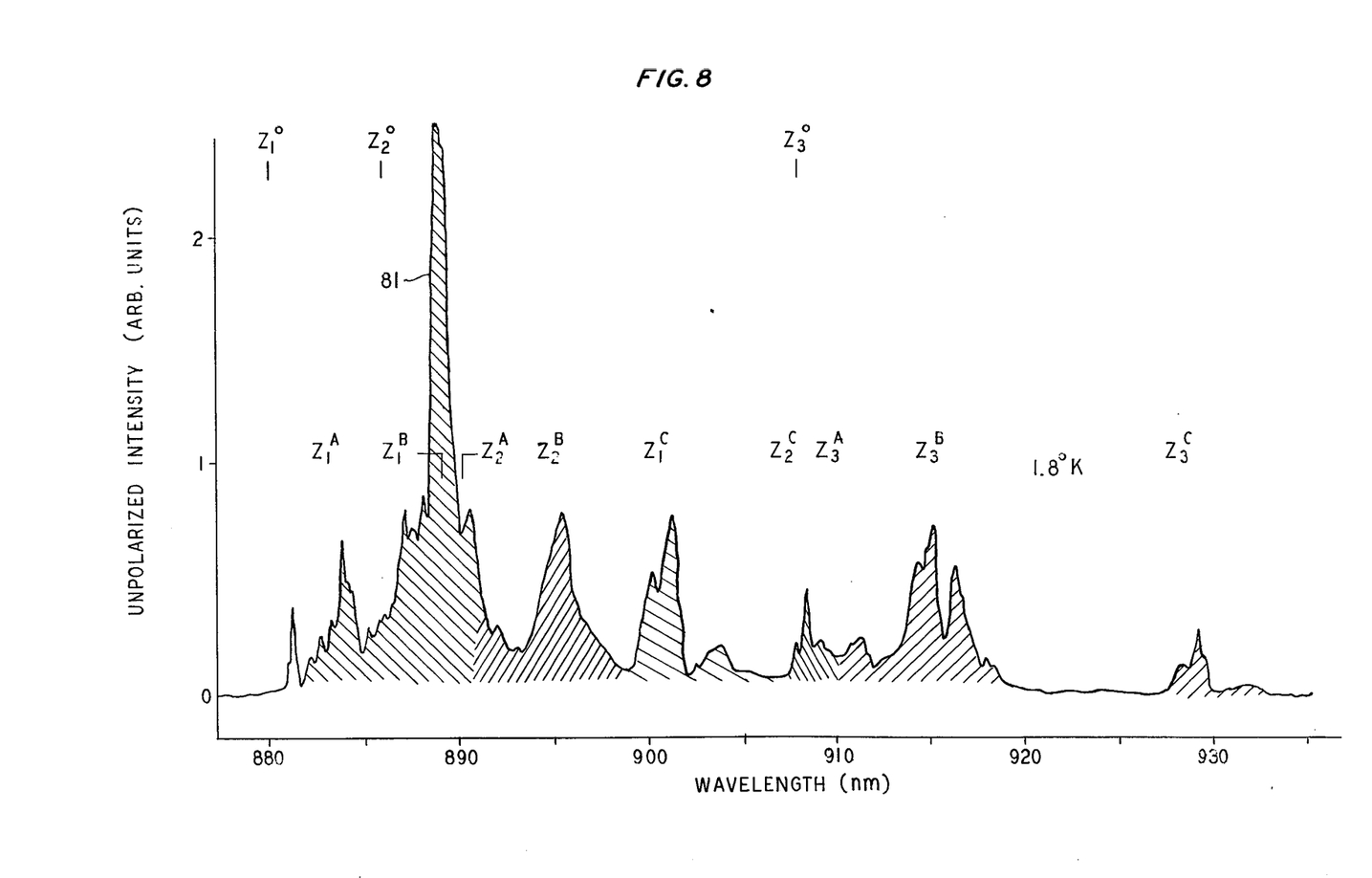

The emission into the $^4I_{9/2}$ ground state manifold is shown in curve 81 of FIG. 8. The spectrum is reproducible from run to run. Because we are now observing transitions to three $^4I_{9/2}$ levels, the assignment is not so straightforward as with the ground state absorption. However, we anticipate similar phonon-assisted spectra as observed in absorption, as the same electronic levels are involved, except that in emission these will be red-shifted relative to the no-phonon energy, the photon emission being associated with phonon emission. The highest energy line at 881.2 nm corresponds with the no-phonon line observed in absorption. By matching the phonon-assisted spectra to that found in absorption we assign the other two no-phonon magnetic dipole transitions at 887.1 nm and 908.3 nm. These are indicated on FIG. 8. Each line is associated with strong phonon-assisted transitions at 80–120 cm$^{-1}$ and 240–250 cm$^{-1}$ as well as weaker bands at 40 cm$^{-1}$ and 270–280 cm$^{-1}$ also seen in absorption. A qualitative assignment of the phonon-assisted intensities A, B and C, related to the corresponding features in FIG. 7, between the three bands is also shown in FIG. 8.

Figure 9:
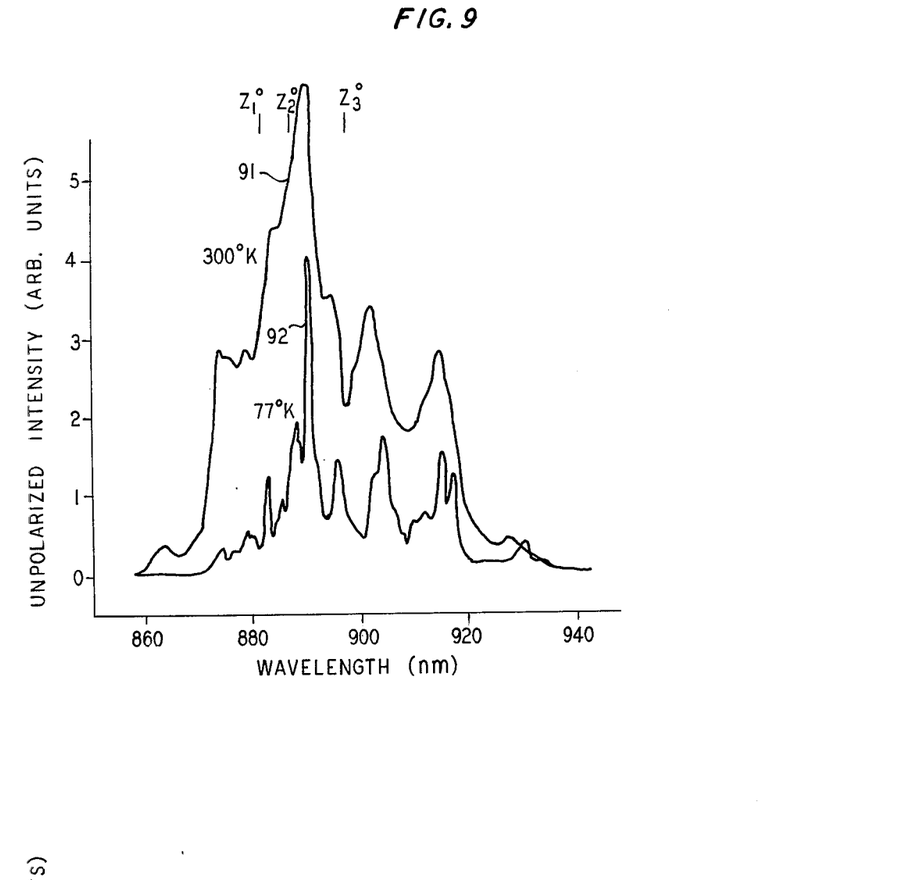

The $^4F_{3/2}$ — $^4I_{11/2}$ emission spectra at 77°K and 300°K, in arbitrary units of unpolarized intensity versus wavelength in nanometers are given in FIG. 9 (curves 92 and 91, respectively); and these spectra also are reproducible from run to run. The positions of the no-phonon lines deduced from FIG. 8 are indicated. The appearance of blue-shifted phonon-absorption-assisted lines at the higher temperatures makes the analysis of these spectra impossible without the evidence gained from the low temperature spectra.

Figure 10:
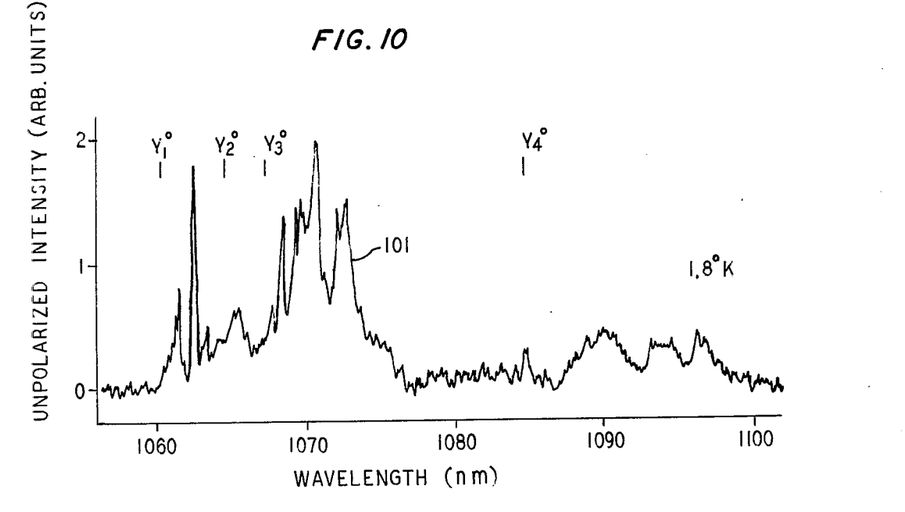
Figure 11:
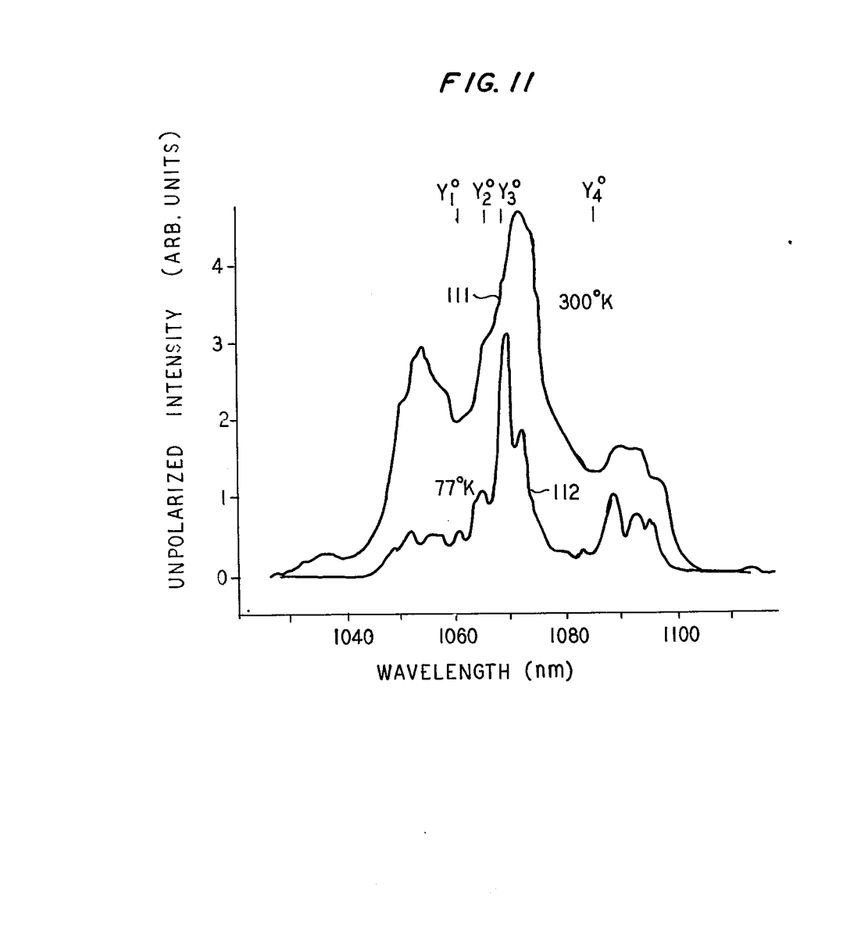

Fluorescence into the $^4I_{11/2}$ manifold is shown in curve 101 of FIG. 10, for 1.8°K, and in curves 112 and 111 of FIG. 11 for 77°K and 300°K, respectively, together with the assignments. Once again the high temperature spectra show considerable structure associated with phonon absorption. A consistent assignment of the spectrum at 1.8°K cannot be made by assuming similar phonon-assisted spectra as for the $^4F_{3/2}$ — $^4I_{9/2}$ transitions, and the appearance of several sharp lines in the emission precludes the assignment of the magnetic dipole transitions on this basis. Our assignment is based on the observation of four broad phonon-assisted peaks at ~1090 nm, ~1094 nm, ~1097 nm in the curve of FIG. 10 and at ~1114 nm (curve 111 of FIG. 11). The first of these is ~250 cm$^{-1}$ from the high energy end of the spectrum and the latter a similar energy below the feature at 1085 nm. It seems reasonable that all four represent phonon-assisted transitions at ~250 cm$^{-1}$ from no-phonon lines and on this basis the no-phonon magnetic dipole lines are assigned to features at 1060.5 nm, 1065.1 nm, 1067.7 nm and 1084.7 nm. The vibronic spectra are different to the $^4I_{9/2}$ vibronic spectra, showing intensity with several sharp lines up to ~40 cm$^{-1}$, and then little intensity before the broad bands at ~250 cm$^{-1}$, which is a feature in common with the $^4I_{9/2}$ spectra.

The emission spectra at 77°K and 300°K are corrected for the spectral sensitivity of the detection system; in the 1.8°K spectra this correction has not been made. All the 77°K and 300°K emission spectra were measured on sample ~0.3 mm thick, which guarantees a negligible modification of the intensity due to reabsorption.

The tentative energy level diagram showing the level positions determined for the $^4I_{9/2}$, $^4I_{11/2}$ and $^4F_{3/2}$ bands is given in FIG. 12. The expected positions of the $^4I_{15/2}$ and $^4I_{13/2}$ levels are also shown.

Nd$^{3+}$ Fluorescence Lifetime

The fluorescence lifetime of the $^4F_{3/2}$ level was measured by exciting the crystal with a pulsed flashlamp pumped Rhodamine 6G dye laser, tuned to the 590 nm absorption band of Cs$_2$NaNdCl$_6$. In accordance with the highly forbidden nature of the electronic transitions observed, very long fluorescence lifetimes are expected. At room temperature the lifetime of Cs$_2$NaNdCl$_6$ was 1.23 msec. The highest lifetimes previously observed (in dilute systems) at room temperature and reported were 0.9 msec in K-Rb-Ba-Si glass, 1.5 msec in CaF$_2$, and 0.7 msec in BaGD$_{0.48}$Nd$_{0.02}$Ta$_{0.5}$O$_3$. This latter crystal is an oxide analogue of the chlorides studied in this work.

In order to investigate the degree of concentration quenching, a crystal of composition Cs$_2$NaNd$_{0.01}$Y$_{0.99}$Cl$_6$ was also grown. The room temperature lifetime was 4.1 msec. It seems unlikely that the emission cross-section is changing with Nd$^{3+}$ concentration. The symmetry is unchanged and the room temperature absorption and emission spectra are qualitatively very similar for the dilute and concentrated samples. It appears, therefore, that concentration quenching still exists, even at 0.77 nm Nd-Nd separation; it is small and similar to that observed in NdP$_5$O$_{14}$. Although we have not determined the position of the intermediate $^4I_{15/2}$ level which can provide an efficient quenching mechanism, it nevertheless seems that an adequate interpretation of the variation of fluorescence quenching from one material to another, taking into account both intermediate level positions and the minimum Nd-Nd separation, has still to be given. This evidence for interactions between the ions, together with the long fluorescent lifetimes does, however, make this host an attractive candidate for energy transfer studies and application.

At higher temperatures, stimulated phonon emission and also phonon absorption can assist the photon emission. Consequently, the emission cross-sections become larger and the lifetimes shorter. At 77°K we observe lifetimes of 5 msec for Cs$_2$NaNdCl$_6$ and 11 msec for the diluted crystal, in qualitative agreement with this expectation.

By integrating the intensities in FIGS. 9 and 11, one evaluates a branching ratio of 1:1 for the transitions into the $^4I_{9/2}$ and $^4I_{11/2}$ bands at 300°K. In order to learn about the fluorescence efficiency we made a relative measurement at room temperature using samples of YAG:Nd, NdP$_5$O$_{14}$ (samples with $\tau_f$ = 66$\mu$sec) and Cs$_2$NaNdCl$_6$. The samples were excited with the 520.8 nm beam of a Kr ion laser and the fluorescence into the $^4I_{9/2}$ band monitored using broadband optical filters and a cooled photomultiplier with an S1 cathode. The same geometry was used for all three measurements. The relative fluorescence yields were: 1:0.18:0.16. The fluorescent yields into the $^4I_{9/2}$ band have been reported to be about 32 percent for both YAG:Nd, and for Nd$_x$La$_{1-x}$P$_5$O$_{14}$ in the zero concentration limit with $\tau_f$ = 300$\mu$sec. Using our measured values for YAG:Nd and NdP$_5$O$_{14}$ as calibration we find the fluorescent yield for Cs$_2$NaNdCl$_6$ into this band to be approximately 5 percent.

The increase of the $^4F_{3/2}$ lifetime from 1.23 msec for the concentrated crystal to 4.1 msec for the diluted crystal implies an increase in fluorescence efficiency into the $^4I_{9/2}$ band to approximately 17 percent, and the integrated intensities indicate a similar yield into $^4I_{11/2}$. This is lower than in YAG and NdP$_5$O$_{14}$, where the fluorescent yield into this level is about 60 percent. The experimental measurement probably gives a lower limit for the fluorescent yield, however, and the absorbed energy unaccounted for by fluorescence into $^4I_{9/2}$ and $^4I_{11/2}$ may be less than 66 percent indicated by this measurement. Multiphonon non-radiative decay is unlikely as the $^4F_{3/2}$ to $^4I_{15/2}$ transition would require at least 17 phonons if a phonon cut-off of 300 cm$^{-1}$ is assumed Fluorescence into $^4I_{15/2}$ and $^4I_{13/2}$ is weak in other compounds but may be relatively stronger in this case because of the dominance of phonon-assisted transitions.

We may make a rough estimate of the peak emission cross-section in Cs$_2$NaNdCl$_6$ at room temperature by comparing the fluorescence efficiency, the emission linewidths of the $^4F_{3/2}$ - $^4I_{11/2}$ transitions and the lifetimes of diluted samples of NdP$_5$O$_{14}$ and CsNaNdCl$_6$. We use the relation $$\Theta_{cl} = \Theta_{pp} \frac{\eta_{cl} \tau_{pp}}{\eta_{pp} \tau_{cl}} \quad_{cl} \quad (2)$$

where $\tau$ is the fluorescence lifetime $\sigma$ is the emission cross-section, $\eta$ the fluorescence efficiency, and $\Delta\lambda$ the linewidth of a particular transition. The subscripts PP refer to the pentaphosphase and Cl to the perovskite respectively. The peak effective emission cross-section in $NdP_5O_{14}$ is $1.2\times10^{-19}cm^2$,[20] $\tau_{PP} = 300\mu sec$, $\Delta\lambda_{PP}/\Delta\lambda_{Cl} \sim 0.5$, $\eta_{PP} \sim 0.6$ and $\eta_{Cl} \sim 0.17$, giving $\sigma_{Cl} \sim 1.2\times10^{-21}cm^2$, which is 100 times smaller than found for $NdP_5O_{14}$.

Figure 2:
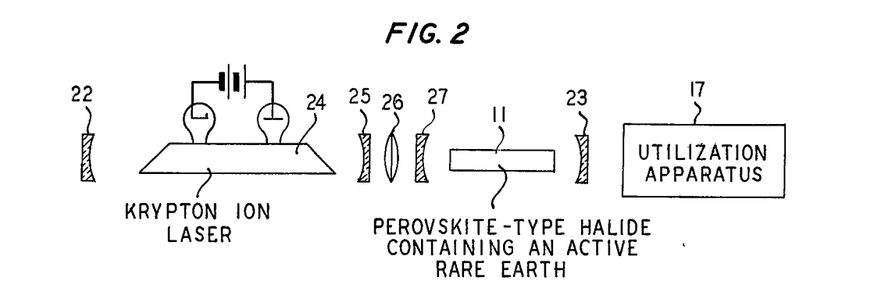
FIG. 2 shows a modification of the embodiment of FIG. 1 employing end-pumping.

A modified embodiment of the invention is shown in FIG. 2 in which the crystal 11, like that of FIG. 1, is pumped by an argon ion or krypton ion laser 24 along its laser axis, that is, by end-pumping. The laser 24 includes its own optical resonator comprising reflectors 22 and 25; and the crystal 11 is disposed in its own optical resonator comprising reflectors 23 and 27. Modes are matched from one resonator to the other by an appropriate lens 26.

In other respects, the embodiment shown in FIG. 2 and its operation are similar to that described above for FIG. 1.

Figure 3A:
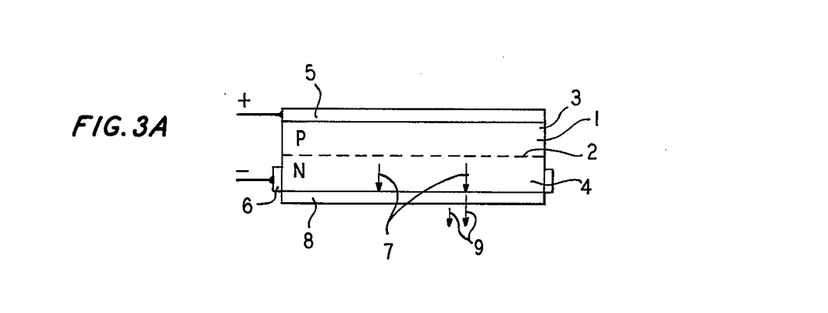
FIG. 3A shows another embodiment of our invention in which the new fluorescent material is used as an up-converting coating on a light-emitting diode.

In the embodiment of FIG. 3A, gallium arsenide diode 1 containing PN junction 2, defined by P and N regions 3 and 4, respectively, is forward biased by planar anode 5 and ring cathode 6 connected to a suitable battery or power supply (not shown). Infrared radiation is produced by junction 2 under forward-bias conditions, and some of this radiation, represented by arrows 7, passes into and through layer 8 of a fluorescent material similar to the laser active medium of FIGS. 1 and 2. Layer 8 is similar to crystals 11 in that it is comprised of rare earth ions in a perovskitetype hexahalide. If differs from crystals 11 of FIGS. 1 and 2 in that it contains, preferably, the pair of rare earth ions ytterbium ($Yb^{3+}$) and erbium ($Er^{3+}$) or the pair of rare earth ions ($Yb^{3+}$) and holmium ($Ho^{3+}$). In the latter respect, layer 8 is like the phosphorescent material disclosed in U.S. Pat. No. 3,599,109 to H. J. Guggenheim et al, issued Aug. 10, 1971.

The ability of such pairs of rare earth ions in a transparent host to convert infrared radiation to visible radiation is fully explained in the just-cited patent; and that explanation is applicable to the present FIG. 3A with only minor changes in energy level values. It is believed that both two-photon absorption processes and higher-order multiple-photon absorption processes should be obtained, so that effective upconversion will be obtained.

Color balance may be effected by employing all three ions $Yb^{3+}$, $Er^{3+}$ and $Ho^{3+}$ and varying the proportions of $Er^{3+}$ and $Ho^{3+}$. The pair including $Ho^{3+}$ should emit only green; while the pair including $Er^{3+}$ has the possibility of emitting red, green or blue according to the suggestion of the foregoing patent. It is there suggested that high conversion efficiency in a particular host is due in part to a long lifetime of the $Er^4I_{11/2}$ excitation level.

According to the teaching of our present invention, the inclusion of $Yb^{3+}$ and $Er^{3+}$ in a perovskite-type crystal such as dicesium, sodium, ytterbium, erbium, hexachloride ($Cs_2NaYbEr_{(1-z)}Cl_6$), where $0.7 \leq Z \leq 0.99$, will increase the lifetimes of the long-lived levels even more than in the $LaF_3$ of the prior patent. Note that halides such as $LaF_3$ do not have a perovskite form.

In like manner to that of the above patent, a bulk crystal of the same material as layer 8 may be pumped by infrared diodes. Such an arrangement is shown in FIG. 3B.

Figure 3B:
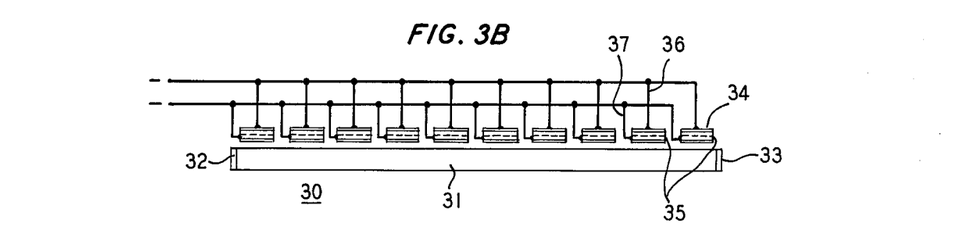
FIG. 3B shows an application of the medium of the embodiment of FIG. 3A as a laser pumped by infrared diodes.

The device of FIG. 3B is an optically-pumped, solid state laser 30 comprising a single crystal rod 31 composed of a perovskite-type hexahalide like layer 8 of FIG. 3A including at least one pair of rare earth ions, such as $Yb^{3+}$-$Er^{3+}$ or $Yb^{3+}$-$Ho^{3+}$, at substantial densities. The rod 31 is provided with reflecting layers 32 and 33, one of which is preferably totally reflective and the other partially reflective to the degree that provides a desired optical gain for amplification or oscillation. It is also believed that thulium ($Tm^{3+}$) is a feasible substitute for $Ho^{3+}$ or $Er^{3+}$.

Rod 31 is optically pumped by light source 34. In the specific example shown, light source 34 is composed of a multiplicity of infrared-emitting diodes 35, such as infrared emitting gallium arsenide diodes as described in FIG. 3A without layer 8. All of diodes 35 are accordingly provided with electrode connections 36 and 37 connected to a power supply (not shown) in a polarity to forward bias diodes 35 to the emitting condition, and may have antireflection coatings on the surfaces toward crystal 31. Other configurations may employ end pumping, GaAs laser diodes, or integrated arrays of diodes.

In each case, the multiple-photon absorption will provide up-conversion of the infrared radiation to the visible.

While the foregoing embodiments have been described mainly with reference to perovskite-type hexachlorides, it should be clear that other perovskite-type hexahalides, such as $Cs_2$ Na $Nd_x$ $R_{1-x}$ $F_6$, the hexafluoride, and $CsNaNd_xR_{1-x}Br_6$, the hexabromide, are close analogues and all are transparent to the frequencies of interest. Also, other pairs of alkali metals may be used. For example, thallium ($Tl^+$) can be substituted for cesium and such metals as copper ($Cu^+$), silver ($Ag^+$) and other alkali metals can be substituted for sodium. In each case, the one of smaller atomic radius will tend to be coordinated on the octahedral sites.

It should also be clear from the discussion of the preceding embodiments that other rare earths can be used instead of neodymium. Typical rare earth ions of interest are praseodymium ($Pr^{3+}$), cerium ($Ce^{3+}$), holmium ($Ho^{3+}$), erbium ($Er^{3+}$), thallium ($Tl^{3+}$) thulium ($Tm^{3+}$), samarium ($Sm^{3+}$), europium ($Eu^{3+}$).

Further advantages of fluorescent devices according to our invention are that the cubic hexahalides are optically not birefringent in contrast to non-cubic materials and the materials melt congruently, making epitaxy possible by melting powders of the crystals. These materials may also be fused and drawn out in crystalline or perhaps glassy fibers. In fact, these devices using crystals material may broadly be considered substitutes for devices employing rare earth ions in various known glasses.

The heat conductivity of the perovskite hexahalide crystals is much greater than that of any known glass. This combined with the higher energy storage capability achievable relative to other crystalline hosts makes it possible to build high energy storage lasers with high repetition rates in pulsed operation.

What is claimed is:

1. A laser of the type comprising a crystal including the active ion as a chemical constituent of the compound forming the crystal means for optically pumping the crystal to produce a population inversion between energy states, and means for resonating radiation associated with transitions between said energy states, characterized in that the crystal comprises a hexahalide crystal having a perovskite structure including two groups of atoms ordered on octahedral sites, one of the two groups containing elements including at least the active ion, said elements being selected from the set of elements consisting of the rare earths and yttrium, at least a portion of said one group being the active ion.

2. A laser according to claim 1 in which the second group of atoms ordered with respect to the first group on octahedral sites consists essentially of an alkali metal selected to have an ionic charge that is substantially different from the ionic charge of the contained elements of the first group.

3. A laser according to claim 2 in which the second group of atoms consists essentially of sodium (Na) atoms.

4. A laser according to claim 1 in which the crystal includes at least a first alkali metal on non-octahedral sites of the perovskite structure, and in which the second group of atoms ordered with respect to the first group on octahedral sites consists essentially of a second alkali metal having a smaller atomic size than said first alkali metal.

5. A laser according to claim 4 in which the crystal is essentially a halide of a perovskite structure, the first alkali metal being cesium and the second being sodium, the active rare earth ion being selected from the group consisting of neodymium, praseodymium, cerium, holmium, erbium, ytterbium, europium and thulium.

6. A laser according to claim 1 in which the crystal consists essentially of $Cs_2NaNdCl_6$.

7. A laser according to claim 1 in which the crystal consists essentially of $Cs_2NaNd_xM_{(1-x)}Cl_6$, where $x$ is between 0.01 and 1.0 and M is an element selected from the group consisting of yttrium, lanthanum, lutetium and gadolinium, Nd and M being the one group of the two groups of elements and Na being the second group, so that Nd and M are ordered with respect to Na on the octahedral sites.

8. A laser according to claim 1, in which the crystal consists essentially of $Cs_2NaNd_yQ_{(1-y)}Cl_6$, where $y$ is between 0.01 and 1.00 and Q is selected from the transition metal elements to transfer energy to Nd, Nd and Q being the one group of the two groups of elements and Na being the second group, so that Nd and Q are ordered with respect to Na on the octahedral sites.

9. A laser according to claim 1, in which the crystal consists essentially of $Cs_2NaQ_zR_{(1-z)}Cl_6$, where Q is a rare earth and R is selected from the rare earths other than Q to enable multiple-photon absorption of the pumping radiation by the QR combination and consequent re-radiation at a substantially higher frequency than that of the pumping radiation.

10. A laser according to claim 9 in which Q is ytterbium (Yb) and R is selected from the group consisting of erbium (Er), holmium (Ho) and thulium (Tm).

11. A fluorescent device of the type comprising a crystal, including at least one rare earth ion as a chemical constituent of the compound forming the crystal and means for optically exciting the crystal to enable fluorescence therefrom, said rare earth ion playing a major role in said fluorescence, characterized in that the crystal has a perovskite structure including two groups of atoms ordered on octahedral sites, one of the two groups containing at least the one rare earth ion, the other group of ions containing elements of a substantially different property comprising one of ionic charge and atomic size from those in the one group.

12. A fluorescent device of the type claimed in claim 11 in which the one group of atoms includes two rare earths cooperative to yield multiple-photon absorption of the exciting radiation and the crystal is transparent and fluorescent at a frequency higher than that of the optical exciting radiation.

13. A fluorescent device of the type claimed in claim 12 in which one rare earth is ytterbium (Yb) and the other rare earth is selected from the group consisting of erbium (Er), holmium (Ho) and thulium (Tm).

* * * * *